United States Patent [19]
Brown

[11] 3,765,180
[45] Oct. 16, 1973

[54] COMPRESSED AIR ENGINE

[76] Inventor: Russell R. Brown, 215 Lafayette St., Harrisburg, Pa. 17109

[22] Filed: Aug. 3, 1972

[21] Appl. No.: 277,629

Related U.S. Application Data

[63] Continuation-in-part of Ser. No. 113,014, Feb. 5, 1971, abandoned.

[52] U.S. Cl.................... 60/370, 60/374, 60/415, 91/4
[51] Int. Cl................... F15b 11/06, F15b 3/00
[58] Field of Search............. 60/57 R, 62, 51, 60/370, 374, 415; 91/4

[56] References Cited
UNITED STATES PATENTS

| | | | |
|---|---|---|---|
| 859,235 | 7/1907 | MacFarren | 60/62 X |
| 1,251,849 | 1/1918 | Vernon | 60/57 R |
| 2,054,570 | 9/1936 | Burt | 60/62 |
| 2,100,445 | 11/1937 | Le Bleu | 60/52 HE X |
| 3,563,032 | 2/1971 | La Pointe | 60/51 |

*Primary Examiner*—Edgar W. Geoghegan
*Attorney*—Lawrence R. Radanovic

[57] ABSTRACT

Compressed air engine having an auxiliary air compressor for building up to a minimum a predetermined air pressure in a compressed air supply tank which feeds air through an engine RPM control valve for the engine pistons. Upon reaching the minimum air pressure, the electric motor is cut off and the auxiliary compressor is simultaneously engaged with the crankshaft to continue to build up to a maximum predetermined air pressure level and maintain this level for operation of the engine. A main recycle air compressor is provided for recycling. The multi-cylinder four-cycle combustion engine motor block may be converted into a four-cycle compressor for the system, and hydraulic means may also be used as a force-multiplying means for operation of the crankshaft.

9 Claims, 5 Drawing Figures

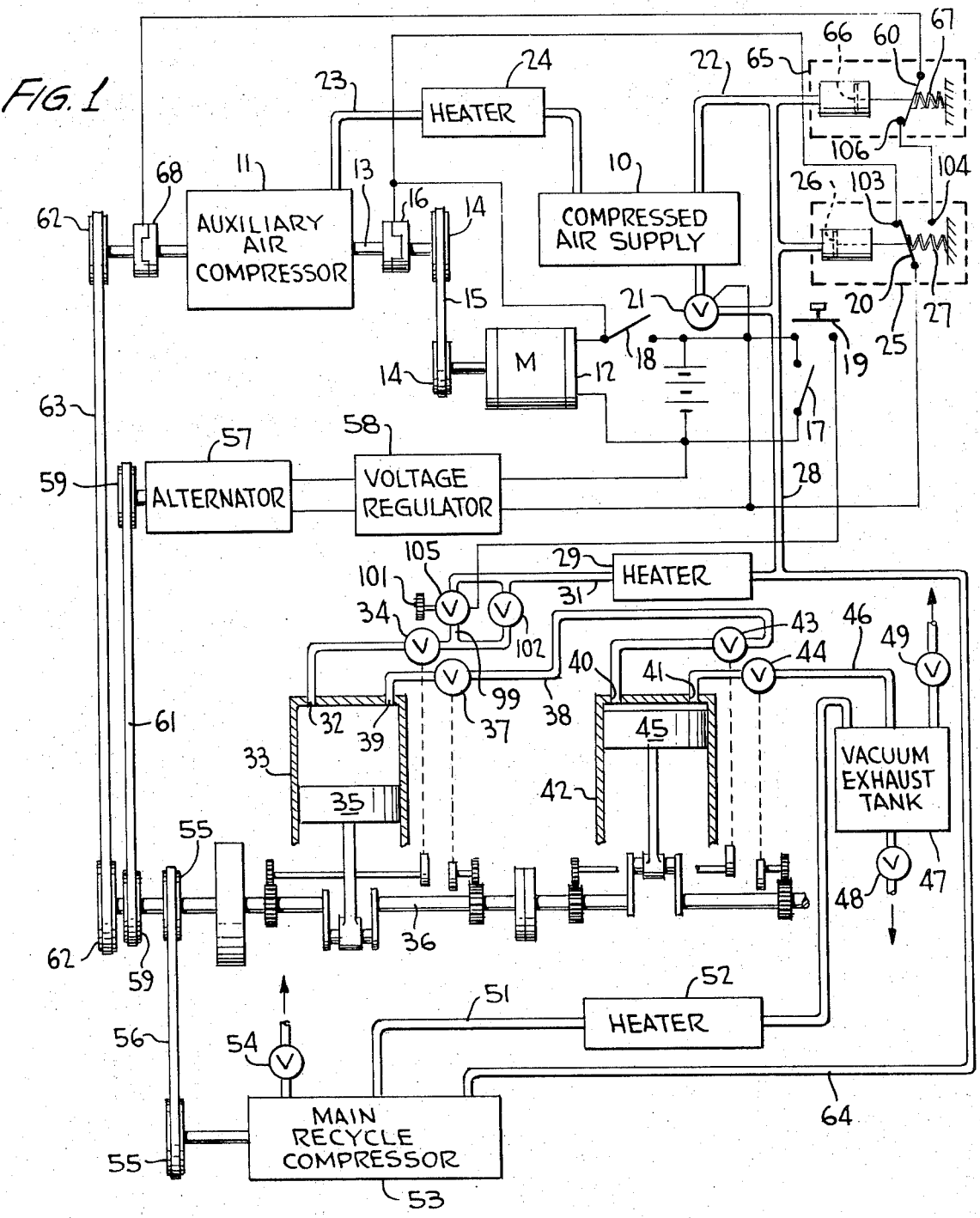

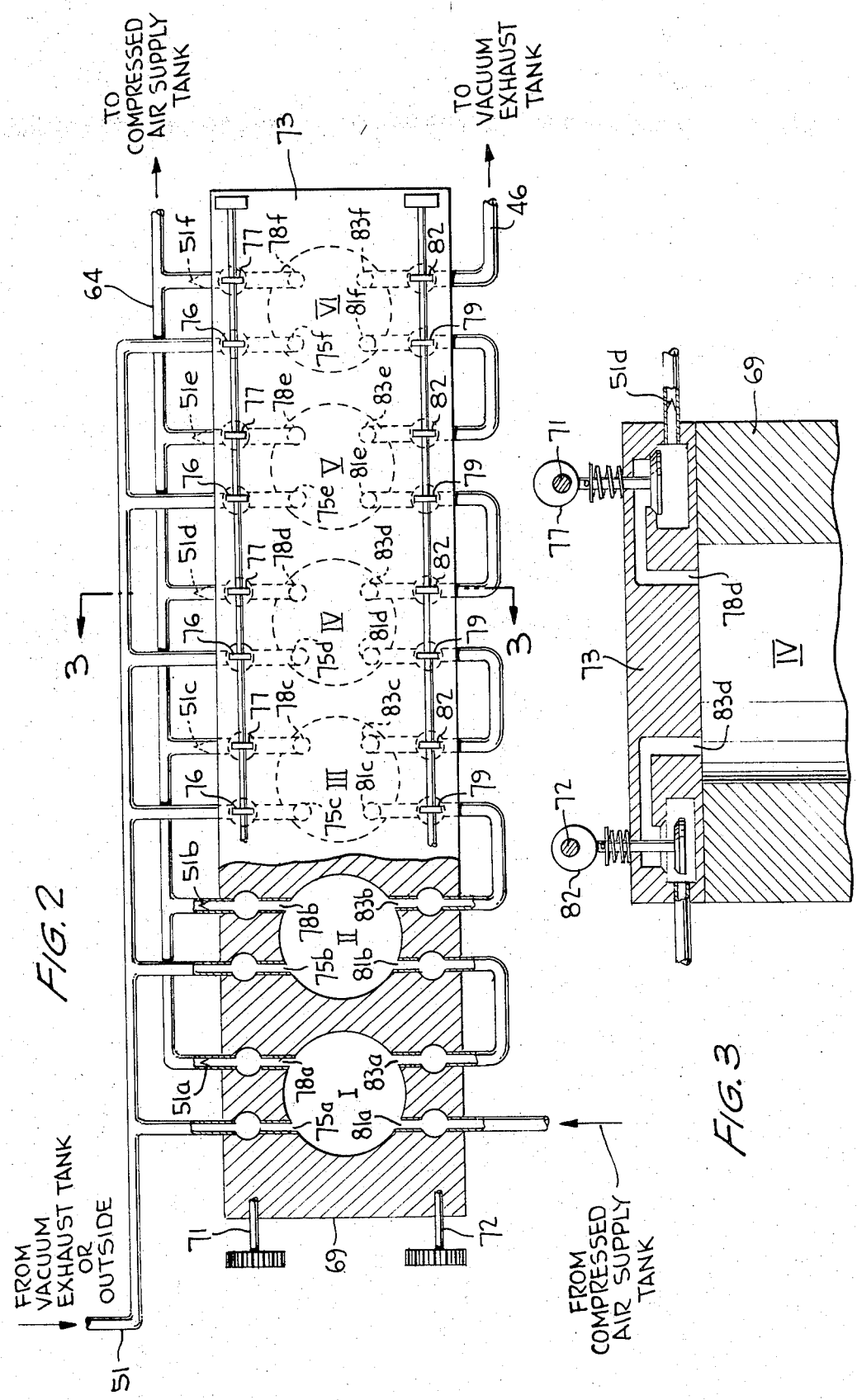

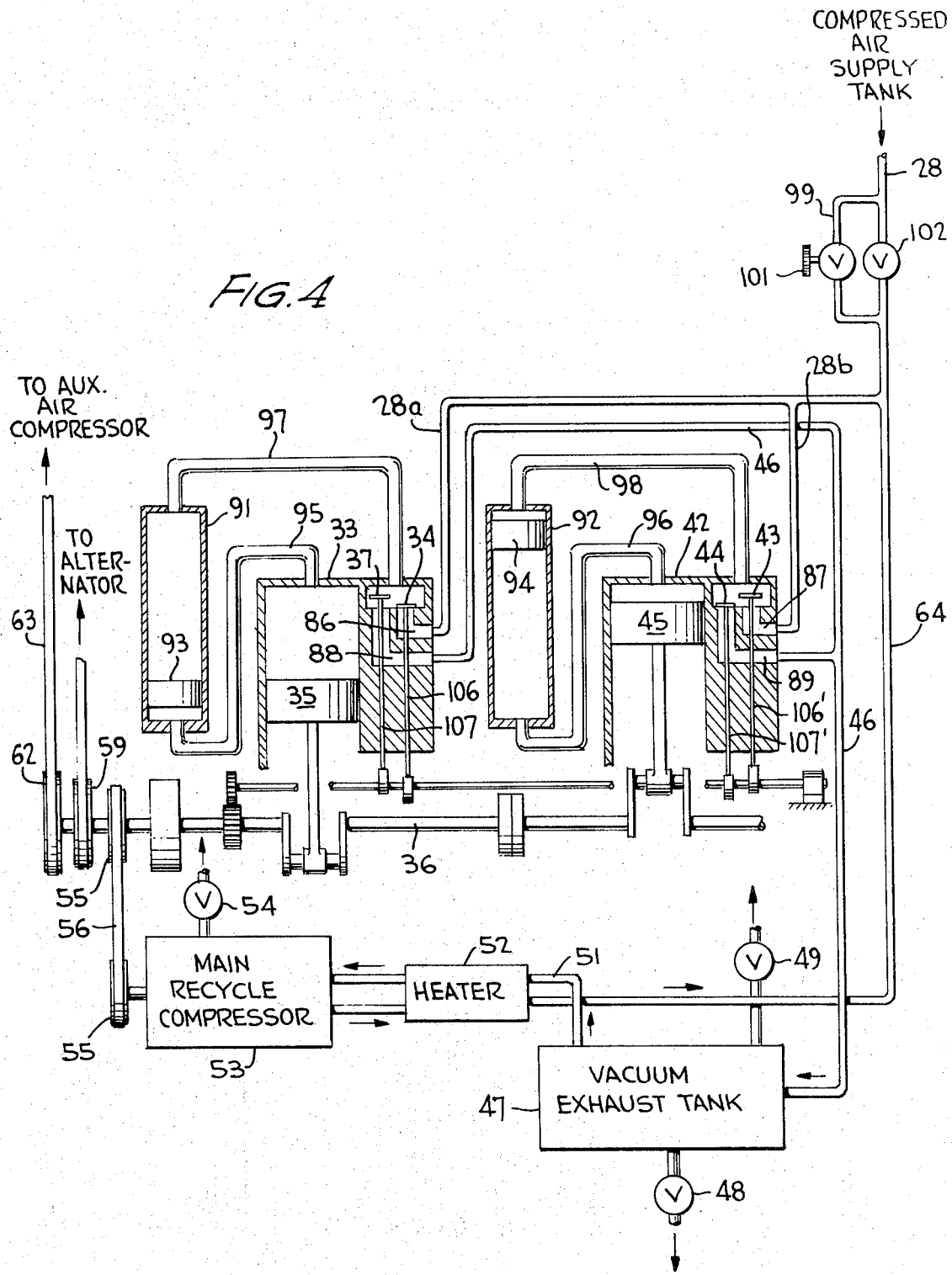

COMPRESSED AIR ENGINE

This application is a continuation-in-part of my co-pending application, Ser. No. 113,014 filed Feb. 5, 1971, and now abandoned.

This invention relates generally to compressed air engines and more particularly to such an engine capable of maintaining the pressure in its supply tank at a predetermined level for efficient and continuous operation.

Internal combustion engines for powering motor vehicles and fossil-burning plants used in energy producing operations throughout the industry, have been under attack for many years because of their inherent characteristics which produce air and other pollutants. Steps have been therefore taken to increase the combustion efficiency and filter the exhaust from these power plants with a view to "saving" the atmosphere through more efficient and cleaner burning. The relative success of such operations has, however, been slow and limited because of the many problems which arise. One of the approaches taken in the production of a completely clean power plant is the design of the air engine which is, of course, completely clean since there are absolutely no combustion gasses to contend with. However, design in this area has been somewhat limited because of the reduced power output capable for such engines and because of their somewhat inefficient and complex operation. The air engine has therefore been used in some cases as an auxiliary power plant with a combustion engine or it has been abandoned in favor of other systems because of the auxiliary power needed to maintain adequate supply of air pressure for the system.

A compressed air engine has been therefore devised which avoids all these drawbacks by making use of an auxiliary air compressor started by an electric motor for maintaining a predetermined minimum operating pressure level necessary for the system by simple, efficient and inexpensive means, the electric motor being shut off when this minimum level is reached. This is the principal object of the present invention.

Another object of this invention is to provide such an air engine which makes use of an auxiliary air compressor having two electric clutch means thereon, one through which the auxiliary compressor is driven to fill a compressed air supply tank up to the predetermined minimum level after which the other clutch means takes over through which the auxiliary compressor is again driven for recharging the compressed air supply tank to continue to build up to a maximum predetermined air pressure level and to maintain this level for smooth operation.

A further object of the present invention is to provide such an air engine wherein a main recycle compressor is also made use of for recycling compressed air throughout the system, this recycle compressor taking in air either from the outside for its operation or from a vacuum exhaust tank into which air from the last of the engine pistons exhausts.

A still further object of this invention is to provide such a compressed air engine which makes use of a multicylinder four-cycle engine converted into a four-cycle compressor used in the system, twin cam shafts being used in a conversion head and being properly timed for the intake and exhaust ports of each cylinder.

A still further object of this invention is to provide such an air engine which additionally makes use of hydraulic means as a force-multiplying factor in operating the pistons for increased efficiency.

Other objects, advantages and novel features of the invention will become apparent when the following detailed description of the invention is considered in conjunction with the accompanying drawings wherein:

FIG. 1 is a schematic view showing the various parts of the compressed air engine in accordance with the present invention;

FIG. 2 is a top plan view, partly broken away, of an engine block converted into a four-cycle air compressor;

FIG. 3 is a sectional view taken substantially along the line of 3—3 of FIG. 2 showing a typical cross-section of the conversion head and a part of one of the cylinders;

FIG. 4 is a schematic view showing another embodiment of a compressed air engine in accordance with the present invention.

Figure 5:
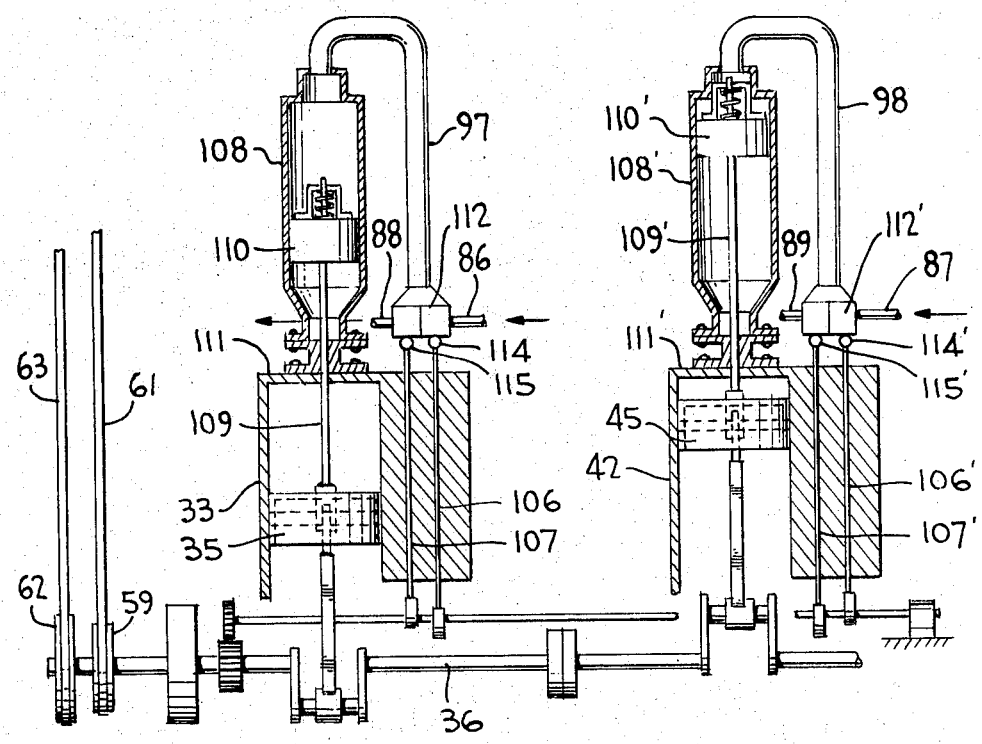
FIG. 5 is a schematic view of still another embodiment of a compressed air engine of the invention.

Turning now to the drawings wherein like reference characters refer to like and corresponding parts throughout the several views, there is shown in FIG. 1 a schematic view of an air engine as having a compressed air supply tank 10 into which compressed air is fed up to a predetermined minimum pressure level by an auxiliary air compressor 11. Compressor 11 is powered by an electric motor 12 which, when energized, rotates drive shaft 13 of the compressor through pulleys 14, belt 15 and a first electric clutch 16. This clutch may be of a type which, when energized, is engaged.

To energize motor 12, an electric switch 17 is actuated which closes the electric circuit for clutch 16 through a closed electric pressure control switch 25, thereby energizing the clutch for engagement and for closing an electromechanical motor switch 18. Operation of the electric motor 12 and engagement of first electric clutch 16 drives shaft 13 thereby causing compressed air to be pumped from auxiliary compressor 11 through air line 23 and into the compressed air supply tank 10. The compressed air may be heated to a predetermined level by means of a coiled heater 24 for purposes of expansion. The compressed air in tank 10 passes through air line 22 and into control switch 25 which remains closed until the pressure builds up to a minimum predetermined level set for minimum operation of the air engine. This switch is designed as having a pressure diaphragm 26 on a contact arm 20 for movement between contact points 103 and 104. Before the minimum predetermined pressure level is reached, a coil spring 27 maintains arm 20 in contact with 103 whereupon clutch 16 remains energized. The spring force of spring 27 is such as will be overcome by the pressure reaching its predetermined minimum as to cause arm 20 to contact 104. At such time, the circuit to clutch 16 is broken and accordingly clutch 16 is disengaged whereupon motor 12 is stopped. In the meantime the engine may be caused to idle by the operator at his discretion by closing an electric switch 19 which serves to open a solenoid valve 21 on tank 10 and another solenoid valve 105 in air line 31 to permit air to by-pass a main control valve 102 thereby allowing the engine to operate at idling speed. A needle valve 101 is provided for adjusting the idle through valve 105.

When motor 12 is stopped, auxiliary air compressor 11 of course also stops. While arm 20 is in contact with point 104 at the minimum predetermined pressure level, the circuit to a second electric pressure control switch 65 is closed through an arm 60 to thereby energize a second electric clutch 68 on drive shaft 13 of compressor 11. Switch 65 is similar to switch 25 in that it includes a diaphragm plate 66 having a contact arm 60 normally maintained in contact with a contact point 106 by means of a coil spring 67. The force of this spring is such that it will not be overcome by the minimum air pressure level but cause the circuit to remain closed until an increased maximum predetermined pressure level is attained. At such time, arm 60 is moved against spring 67 away from contact 106 thereby breaking the circuit and disengaging clutch 68 for stopping compressor 11. Also, as the maximum pressure level drops slightly, clutch 68 will be again engaged since arm 60 will again contact point 106. Compressor 11 will therefore again be turned on to replenish this loss during engine operation.

Compressed air is fed through line 28 and into a coiled heater 29, through line 31 and into the intake port 32 of a first engine piston cylinder 33. Intake valve 34 is designed as being closed when piston 35 of the first cylinder is in its lowermost down stroke as shown. Piston 35 is connected to a crankshaft 36 as is intake valve 34 and an exhaust valve 37, each of which being operable for opening and closing the respective intake and exhaust ports in a conventional manner as by cam lifters as the crankshaft rotates. Air line 38 connects the exhaust port 39 of piston cylinder 33 with the intake port 40 of a second piston cylinder 42 so that, upon the upward stroke of piston 35, compressed air is fed through air line 38 and into second piston cylinder 42 at which time intake valve 43 is opened and exhaust valve 44 is closed, both these valves being connected to crankshaft 36 in a normal manner for opening and closing their respective intake and exhaust ports 40 and 41 via their respective cam lifters from the crankshaft. Upon the upward stroke of piston 45, compressed air is fed through open exhaust port 41 and air line 46 and into a vacuum exhaust tank 47. A drain plug or valve 48 is provided for tank 47 and a maximum vacuum relief valve 49 is also provided in the event it becomes necessary to vent tank 47. Compressed air is then fed through air line 51, which may be heated for expansion by a coiled heater 52, and is fed into a main recycle air compressor 53. A maximum air pressure control valve 54 is provided thereon, and the compressor is operatively connected with crankshaft 36 through pulleys 55 and belt 56. An alternator 57 and a voltage regulator 58 are also operatively connected to crankshaft 36 by means of pulleys 59 and belt 61. Moreover, driveshaft 13 of the auxiliary air compressor 11 is operatively connected with crankshaft 36 via pulleys 62 and a belt 63.

When the air engine is put into operation and clutch 68 is engaged, compressor 11 is belt driven from crankshaft 36 and continues operation to attain the predetermined maximum air pressure and thereafter, intermittently or at frequent intervals, as controlled by switch 65, to replenish any slight losses during engine operation. However, each time the air pressure drops below the predetermined minimum operating level, motor 12 is automatically turned on through pressure control switch 25 as the arm 20 thereof contacts contact point 103 under the action of spring 27. The electric circuit to clutch 16 is then closed and, in the manner as aforedescribed, compressor 11 is turned on through operation of motor 12 to build the pressure back up to the predetermined minimum operating level.

Turning to FIG. 2 of the drawings, a six-cylinder four-cycle engine replacement conversion head 73 which, when adapted to a standard engine block 69, permits it to remain as a four-cycle power stroke and a four-cycle air compressor, or an air engine one-half of the time and an air compressor one-half of the time. This standard engine block is shown as having six cylinder bores I to VI usable in place of the two-cycle cylinders 33 and 42 in the system as described above with reference to FIG. 1. As will be seen, the FIG. 2 arrangement acts as a four-cycle air compressor or an air engine one-half the time and as an air compressor one-half the time thereby eliminating the need for compressor 53. Two standard four-cycle cam shafts 71, 72, properly timed, are provided with respective eccentric cam lobes 76, 77 and 79, 82. Each cam shaft 71 and 72 is operatively connected with crankshaft 36 in timed relation so that, for example, shaft 71 is in phase therewith and shaft 72 is out of phase. Each of the lobes 76 is associated with respective intake ports 75a through 75f, lobes 77 are each associated with respective exhaust ports 78a through 78f, lobes 82 are each associated with respective intake ports 81a through 81f and lobes 79 are each associated with respective exhaust ports 83a through 83f. These lobes are each designed for proper timing so that port 81a is open at the top of the power stroke for the piston (not shown) of bore I while the remaining three ports 83a, 75a and 78a are closed during travel of the piston from top to bottom. At the bottom of the power stroke, 81a closes and 83a opens along with 81b allowing exhaust from cylinder I to the next cylinder II in series order. When the piston in bore 1 travels from bottom to the top of its cylinder, port 83a closes and, simultaneously, 75a opens and remains open as the piston travels from top to bottom of its compression stroke pulling the vacuum from the vacuum exhaust tank 47 or from the outside. At the bottom of the compression stroke ports 75a, 81a, 83a are closed and ports 78a opens to exhaust air past a baffle valve 51a and through exhaust manifold 64 to the compressed air supply tank 10. When port 81b is open (as aforedescribed) the piston in cylinder bore II operates in the same manner as the piston described above in cylinder bore I, and so on for cylinder bores II to VI in series order. For cylinder VI, the exhaust from the power stroke, however, is exhausted into the vacuum exhaust tank 47 from which the pistons of all cylinders pull in outside air or from the vacuum exhaust tank for the intake of the compression stroke.

FIG. 3 is a typical cross-sectional view through the block 69 and conversion head 73 showing only ports 78d and 83d and baffle valve 51d, it being understood that ports 75d and 81d of cylinder IV are similar in all respects to the ports shown herein but are omitted for purposes of clarity. The remaining cylinders are similarly designed for operation in accordance with the above description.

In the FIG. 2 embodiment, crankshaft 36 is not shown although it is operatively interconnected as in FIG. 1 to each of the six piston rods. The air engine as described in FIG. 1 is otherwise the same except that the four-cycle six cylinder engine of FIG. 2 is used instead of the two-cycle two cylinder 33, 42 arrangement of FIG. 1 in conjunction with compressor 53.

Another embodiment of the invention is shown in FIG. 4 of the drawings which schematically sets forth the different characteristics of this embodiment as compared to that of FIG. 1. Accordingly, those identical elements including the compressed air supply tank, the electric motor, the auxiliary air compressor and the two electric pressure control switches are not shown and similar elements of FIG. 1 bear the same reference numerals in this Figure.

Instead of piston cylinders 33 and 42 being serially connected as they are in FIG. 1, they are connected in parallel in FIG. 4 so that compressed air through line 28 is fed through lines 28a and 28b into respective intake ports 86 and 87 of the two piston cylinders. The intake and exhaust valves 34, 43 and 37, 44, respectively, for each of the piston cylinders are operatively connected to crankshaft 36 in the customary manner for opening and closing their respective intake ports 86, 87 and exhaust ports 88, 89 as push rods 106, 107 and 106', 107' are alternately lifted by rotation of their respective cam lobes during crankshaft rotation.

Compressed air through air lines 28a and 28b is fed through the open one of intake ports 86, 87 and to the top of hydraulic cylinder 91, 92, each of which has a floating piston 93, 94, respectively, therein. The floating piston, for example, 94, as shown in FIG. 4, is pushed downwardly which in turn feeds hydraulic fluid through a fluid line 96 to the top of piston cylinder 42 thereby causing piston 45 to be moved downardly. Piston 35 of cylinder 33 is correspondingly moved upwardly by the crankshaft rotation so as to feed hydraulic fluid through its fluid line 95 and back into cylinder 91 thereby elevating floating piston 93 and forcing the compressed air through its line 97 and through the exhaust port 88 into air line 46 and into vacuum exhaust tank 47 (or to the outside). Floating piston 93 is moved downwardly and floating piston 94 upwardly in reverse order for that described above upon continued crankshaft rotation. The pressure created in the fluid by a small force acting on floating pistons 93 and 94 in their respective cylinders results in a large force on the respective large pistons 34 and 35, thereby effecting a more efficient rotation of crankshaft 36.

The FIG. 1 embodiment may be easily modified to include the hydraulic means as disclosed in FIG. 4 with the use of appropriate plates and gaskets embodying a fluid line 96 and air line 98 for piston cylinder 42, and similar gaskets and plates embodying a fluid line 95 and air line 97 for piston cylinder 33 for diverting the air flow to the hydraulic cylinders instead of directly to piston cylinders 33, 42 as in FIG. 1.

Another embodiment, shown in FIG. 5, demonstrates another type of mechanical advantage developed for the engine pistons, except that the floating pistons of FIG. 4 are eliminated and sealed piston cylinders 108, 108' are each instead connected directly with each piston 35 and 45 located within respective cylinders 33 and 42. Those pistons may be of any desired shape since no rings are needed. Only a wrist pin action (as shown) is designed between the piston and its rod, and a crank action occurs between its rod and the crankshaft. Accordingly, cylinders 33 and 42 respectively act as guides for pistons 35 and 45. Rods 109, 109' of pistons 110, 110' in each cylinder 108, 108' are connected to each of their respective pistons 35 and 45.

As in FIG. 4, rods 106, 106' and 107, 107' are each extended through respective cylinder head plates 111, 111' with each of these rods being in contact with a respective button type air valve 112, 112' as shown. These air valves are each of a conventional design so that, upon upward movement of their respective buttons 114, 114' and 115, 115', air is permitted to flow therethrough.

Intake ports 86, 87 and exhaust ports 88, 89 are respectively located in air valves 112, 112'.

Compressed air through air lines 28a and 28b (not shown in FIG. 5 for clarity) is fed through the open one of intake ports 86, 87 in valves 112, 112' and to the top of pistons 110, 110' through air lines 91, 98 as one of respective rods 106, 106' is lifted by rotation of its cam lobe during crankshaft rotation. Assuming piston 110' is thereby pushed downwardly, piston 45 is also caused to be moved downwardly. Piston 35 of cylinder 33 is correspondingly moved upwardly by crankshaft rotation at which time its exhaust port 88 is open and its intake port 86 closed by movement of rods 107 and 106 during crankshaft rotation. At the top the stroke of piston 110, port 86 opens and port 88 closes, with the reverse for ports 87 and 89, so that downward stroke of piston 110 may be effected in the same manner as described for cylinder 108'.

It should be understood that the engine in accordance with the FIG. 5 is the same as that of FIGS. 1 and 4 except for those differences as aforedescribed. Accordingly, compressors 11 and 53, switches 25 and 65, tanks 10 and 47, motor 12 and the various air and electrical interconnections are also used for the FIG. 5 embodiment but are not shown for purposes of clarity.

In view of the foregoing, it can be seen that a simple, efficient and highly effective compressed air engine has been devised which makes use of an electric motor for starting an auxiliary air compressor for pressurizing a compressed air supply tank which, after a minimum predetermined pressure level is reached, commences operation of piston cylinders for rotation of a crankshaft. The electric motor is stopped as soon as this minimum predetermined pressure level is reached after which the auxiliary air compressor continues operation from the crankshaft by means of pressure control switches which serve to first de-energize one electric clutch and thereafter energize another electric clutch connected to the compressor. Hydraulic means may be used to increase the moving force on the pistons to effect a more efficient crankshaft rotation, and a conversion head is made use of in converting a standard multicylinder four-cycle engine block into a four-cycle air engine and a four-cycle air compressor for the air engine.

Obviously, many modifications and variations of the present invention are possible in the light of the above teachings. It is therefore to be understood that within the scope of the appended claims, the invention may be practiced otherwise than as specifically described.

What is claimed is:

1. A compressed air engine having engine pistons for rotation of a crankshaft, the engine being characterized by a compressed air supply tank connected with an auxiliary air compressor, first electric clutch means on said air compressor, a switch operated electric motor operatively connected with said air compressor, a first electric pressure control switch connected with said clutch means, an electric switch for energizing said clutch and the switch of said electric motor thereby actuating said motor for driving said compressor through said first clutch, said tank being connected with said engine pistons in series, means for operating said pistons from said tank after a predetermined minimum air pressure level is reached, a main recycle air compressor interconnected between the last of said series connected pistons and said supply tank for recycling compressed air through the engine, a second electric clutch means on said auxiliary air compressor, and a second electric pressure control switch connected with said second clutch means, said auxiliary air compressor being operatively connected with said crankshaft, said first electric pressure control switch being so arranged as to open to thereby de-energize said first clutch and stop said motor when the pressure in said tank reaches the minimum predetermined operating air level, said second electric pressure control switch being so arranged as to be closed to thereby energize said second clutch at the time said first clutch is de-energized maintaining operation of said auxiliary air compressor from the crankshaft up to a maximum predetermined operating air pressure level, and again starting said auxiliary air compressor when the pressure in said tank falls below said maximum predetermined operating air level.

2. The engine according to claim 1 wherein said main recycle air compressor is operatively connected with said crankshaft.

3. The engine according to claim 1 wherein a vacuum exhaust tank is provided into which said last piston exhausts and from which air is fed into said main recycle air compressor.

4. A compressed air engine having engine pistons for rotation of a crankshaft, the engine being characterized by a compressed air supply tank connected with an auxiliary air compressor, first electric clutch means on said air compressor, a first electric pressure control switch connected with said clutch means, an electric switch for energizing said clutch and the switch of said electric motor thereby actuating said motor for driving said compressor through said first clutch, said tank being connected with said engine pistons in series, means for operating said pistons from said tank after a predetermined minimum air pressure level is reached, a second electric clutch means on said auxiliary air compressor, and a second electric pressure control switch connected with said second clutch means, said compressor being operatively connected with said crankshaft, said first electric pressure control switch being so arranged as to open to thereby de-energized said first clutch and stop said motor when the pressure in said tank reaches the minimum predetermined operating air level, said second electric pressure control switch being so arranged as to be closed to thereby energize said second clutch at the time said first clutch is de-energized maintaining operation of said auxiliary air compressor from the crankshaft up to a maximum predetermined operating air pressure level and again starting said auxiliary air compressor when the pressure in said tank falls below said maximum predetermined operating air level, said pistons comprising a multi-cylinder four-cycle engine having intake and exhaust valves for each power stroke thereof, intake and exhaust valves for each compression stroke thereof, and a baffle valve in the exhaust of the compression stroke for each said cylinder, a camshaft for said power stroke valves and another camshaft for said compression stroke valves, cam lobes on each said camshaft arranged to open and close said valves during the power and compression strokes in series order upon rotation of said camshaft.

5. A compressed air engine having engine pistons for rotation of a crankshaft, the engine being characterized by a compressed air supply tank connected with an auxiliary air compressor, first electric clutch means on said compressor, a switch operated electric motor operatively connected with said air compressor, a first electric pressure control switch connected with said clutch means, an electric switch for energizing said clutch and the switch of said electric motor thereby actuating said motor for driving said compressor through said first clutch, said tank being connected with said engine pistons in parallel, fluid means for operating said pistons from said tank after a predetermined minimum air pressure level is reached, means associated with each of said engine pistons for actuating said pistons, a main recycle air compressor interconnected between said parallely connected pistons and said supply tank for recycling compressed air throughout the engine, a second electric clutch means on said auxiliary air compressor, and a second electric pressure control switch connected with said second clutch means, said auxiliary air compressor being operatively connected with said crankshaft, said first electric pressure control switch being so arranged as to open to thereby de-energize said first clutch and stop said motor when the pressure in said tank reaches the minimum predetermined operating air level, said second electric pressure control switch being so arranged as to be closed to thereby energize said second clutch at the time said first clutch is de-energized thereby maintaining operation of said auxiliary air compressor when the pressure reaches a minimum predetermined level from the crankshaft up to a maximum predetermined operating air pressure level and again starting said auxiliary compressor when the pressure in said tank falls below said maximum predetermined operating air pressure level.

6. The engine according to claim 5 wherein said main recycle air compressor is operatively connected with said crankshaft.

7. The engine according to claim 5 wherein a vacuum exhaust tank is provided into which each of said pistons exhaust and from which air is fed into said main recycle air compressor.

8. The engine according to claim 5 wherein said fluid means comprises a hydraulic cylinder for each said piston at least partially filled with hydraulic fluid and having a floating piston therein for forcing the fluid from said hydraulic cylinder into its connected piston cylinder upon movement of said floating piston by the compressed air from the supply tank.

9. The engine according to claim 5 wherein said fluid means comprises a sealed air cylinder having a piston therein connected to each said engine piston which acts as a guide for its respective air cylinder piston, the downward movement of the power stroke of each said engine piston being actuated by its respective air cylinder piston.

* * * * *